United States Patent
Collipi et al.

(10) Patent No.: US 7,436,295 B2
(45) Date of Patent: Oct. 14, 2008

(54) METHOD AND APPARATUS FOR ANALYZING SURVEILLANCE SYSTEMS USING A TOTAL SURVEILLANCE TIME METRIC

(75) Inventors: Thomas Tilden Collipi, Melbourne, FL (US); David F. Harvey, Melbourne, FL (US)

(73) Assignee: Northrop Grumman Corporation, Los Angeles, CA (US)

(*) Notice: Subject to any disclaimer, the term of this patent is extended or adjusted under 35 U.S.C. 154(b) by 299 days.

(21) Appl. No.: 11/455,394

(22) Filed: Jun. 19, 2006

(65) Prior Publication Data
US 2008/0086341 A1 Apr. 10, 2008

(51) Int. Cl.
G08B 29/00 (2006.01)
(52) U.S. Cl. ............... 340/506; 701/29; 701/30
(58) Field of Classification Search ......... 340/506, 340/438, 439, 870.1, 945, 539.1, 539.22, 340/539.26; 701/29, 30, 3, 14; 342/357.06, 342/37; 455/431
See application file for complete search history.

(56) References Cited

U.S. PATENT DOCUMENTS

| | | | |
|---|---|---|---|
| 4,926,362 A | 5/1990 | Carns et al. | |
| 5,235,506 A | 8/1993 | O'Brien, Jr. | |
| 5,303,170 A | 4/1994 | Valko | |
| 5,402,335 A | 3/1995 | O'Brien | |
| 6,131,076 A * | 10/2000 | Stephan et al. | 700/29 |
| 6,216,063 B1 * | 4/2001 | Lind et al. | 701/3 |
| 6,651,012 B1 * | 11/2003 | Bechhoefer | 701/300 |
| 6,876,948 B1 | 4/2005 | Smith | |
| 6,945,780 B2 | 9/2005 | Perry | |
| 2002/0142267 A1 | 10/2002 | Perry | |
| 2002/0150866 A1 | 10/2002 | Perry et al. | |
| 2002/0169658 A1 | 11/2002 | Adler | |
| 2003/0187967 A1 | 10/2003 | Walsh et al. | |
| 2003/0224332 A1 | 12/2003 | Trachuk | |
| 2004/0116090 A1 | 6/2004 | Gounalis | |
| 2004/0117042 A1 | 6/2004 | Jackson et al. | |
| 2005/0038628 A1 | 2/2005 | Beuttel et al. | |
| 2005/0046584 A1 * | 3/2005 | Breed | 340/825.72 |
| 2007/0027593 A1 * | 2/2007 | Shah et al. | 701/30 |
| 2007/0040064 A1 * | 2/2007 | Lee | 700/283 |
| 2008/0040190 A1 * | 2/2008 | Khosla et al. | 705/9 |

* cited by examiner

*Primary Examiner*—John A Tweel, Jr.
(74) *Attorney, Agent, or Firm*—Robert P. Lenart, Esq.; Pietragallo Gordon Alfano Bosick & Raspanti, LLP

(57) ABSTRACT

A method comprises the steps of receiving information concerning the operation of surveillance assets, and using the information in a Monte Carlo simulation to produce an estimate of total surveillance time. An apparatus that is used to perform the method is also provided.

13 Claims, 3 Drawing Sheets

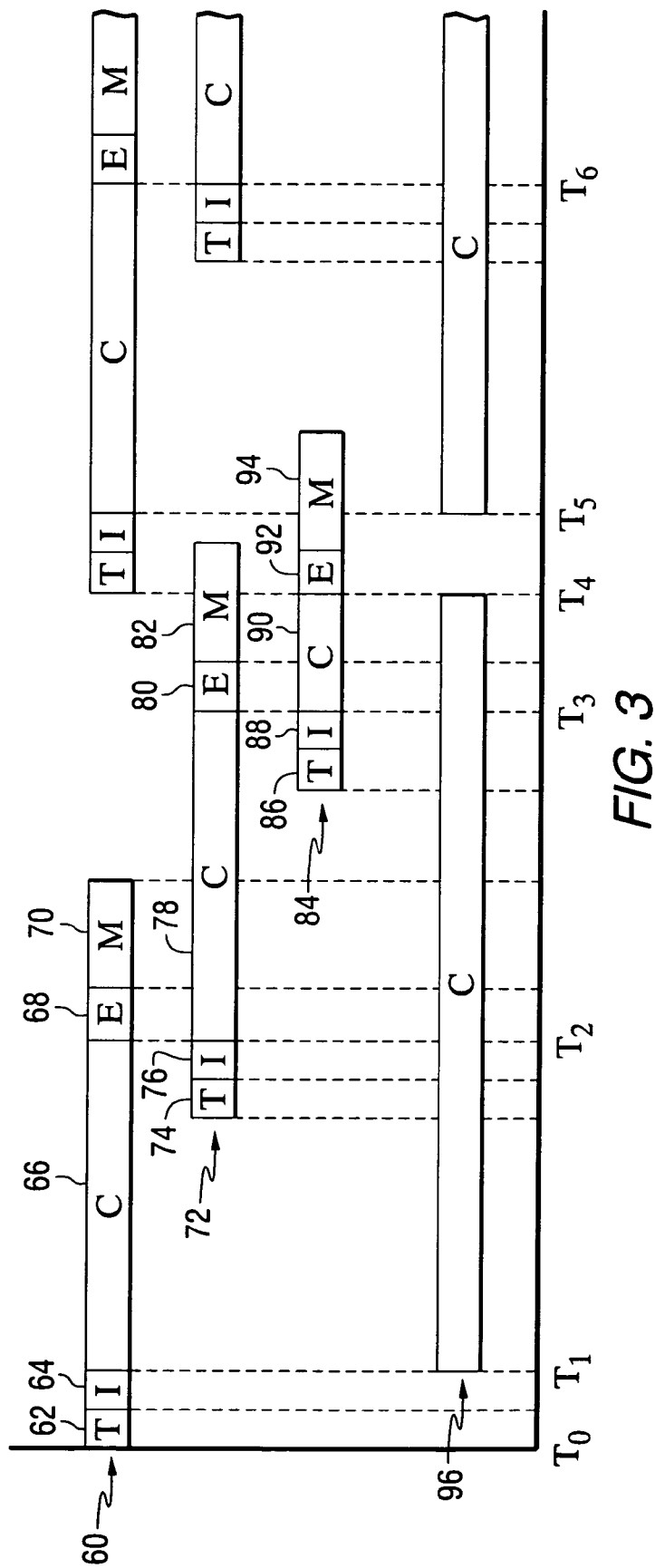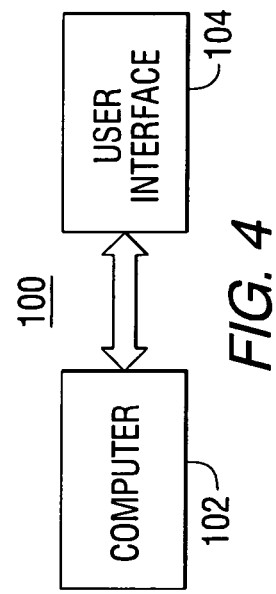

METHOD AND APPARATUS FOR ANALYZING SURVEILLANCE SYSTEMS USING A TOTAL SURVEILLANCE TIME METRIC

STATEMENT OF GOVERNMENT INTEREST

This invention was made under Contract No. F19628-03-C-0014. The United States Government has rights in this invention under the contract.

FIELD OF THE INVENTION

This invention relates to methods and apparatus for analyzing the operation of surveillance systems.

BACKGROUND OF THE INVENTION

Intelligence, Surveillance and Reconnaissance (ISR) systems may include a plurality of sensors mounted on a plurality of airborne platforms, which can be for example manned or unmanned aircraft. The sensors are used to gather information about an area of interest. Communication links can be provided to transmit the collected information.

Traditional system reliability and maintainability (R&M) metrics for Intelligence, Surveillance and Reconnaissance (ISR) platforms include an indication of the Operational Availability ($A_o$) of system assets, and an indication of the mission reliability (MR). Availability is a measure of fleet status, for example, the percent of assets available to begin a mission. Mission reliability is a measure of the probability of successful mission completion. $A_o$ and MR are static metrics and do not portray inherent system robustness.

Operational availability is the probability that a system will be operating or capable of operation when required. In the context of an airborne surveillance system, it includes squadron metric-uptime/possessed hours, and approximates a readiness-to-launch rate. Possessed hours represent the calendar time, in hours, that aircraft are "possessed" by the squadron and not reassigned to backup or depot status.

The availability metric is typically used during an operation and support phase of a system's life, and is the same as a mission capable (MC) rate. It can also be used in an acquisition phase, but is limited by customer understanding of logistics delay times. $A_O$ does not provide any information about an asset's ability to perform the mission.

The mission reliability metric estimates the probability of success for a single mission in a single time period. It also estimates the average time between mission-ending failures. Mission reliability can be defined as: a measure of the ability of an asset to perform its required mission-critical functions for the duration of a specified mission; or the probability that a system can complete its required operational mission without an operational mission failure (OMF). An OMF is a failure that prevents the system from performing one or more mission-essential functions, or a measure of operational effectiveness that reflects the frequency with which a commander would remove a system from the ongoing mission and/or not begin another mission.

Traditional system reliability and maintainability (R&M) metrics for Intelligence, Surveillance and Reconnaissance (ISR) platforms fail to adequately measure the utility of the ISR system.

There is a need for a method and apparatus for analyzing ISR systems that can provide an indication of the utility of the system.

SUMMARY OF THE INVENTION

The invention provides a method comprising the steps of: receiving information concerning the operation of surveillance assets, and using the information in a Monte Carlo simulation to produce an estimate of total surveillance time.

In another aspect, the invention provides an apparatus for providing an indication of the utility of an intelligence, surveillance and reconnaissance system. The apparatus comprises a computer programmed to process information about the operation of assets in the intelligence, surveillance and reconnaissance system and to produce an indication of a total surveillance time for various operating scenarios of the assets, and a user interface operatively coupled to the computer system for inputting data into the computer system and for receiving the indication of a total surveillance time.

BRIEF DESCRIPTION OF THE DRAWINGS

FIG. 3 is a schematic diagram that illustrates the method of this invention.

FIG. 4 is a block diagram of a system constructed in accordance with an embodiment of the invention.

DETAILED DESCRIPTION OF THE INVENTION

This invention uses the Total Surveillance Time (TST) as a metric for representing the ability of an ISR system to keep an area of interest under continuous surveillance for a specified period of time.

Figure 1:
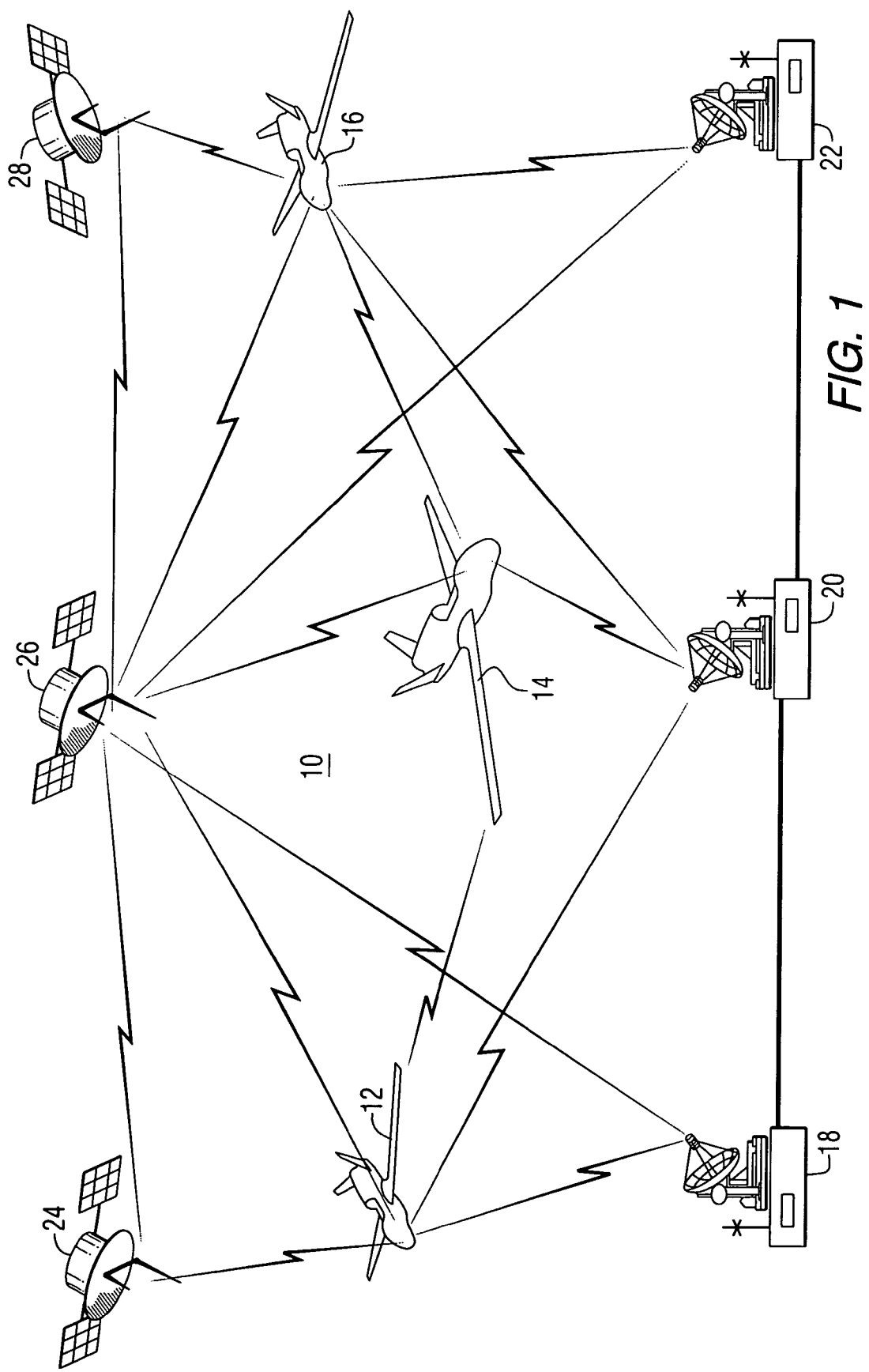
FIG. 1 is a schematic representation of a system that can be simulated using the invention.

FIG. 1 is a schematic representation of an ISR system 10 that can be simulated using the invention. The system in this example includes a plurality of air vehicles (which can be manned or unmanned) 12, 14 and 16. Each of the air vehicles carries one or more sensors for supplying information about an area of interest. The air vehicles can communicate with a plurality of ground stations 18, 20 and 22, and a plurality of satellites 24, 26 and 28. Communication links are provided among the various system components to achieve the desired functionality.

The sensors can be, for example, radar, electro-optical or infrared sensors. The communication system has a loop response time. Timeliness is important for mission success. It is generally desirable to provide continuous coverage of the area of interest. Thus surveillance system simulators should include metrics that reflect that goal.

Figure 2:
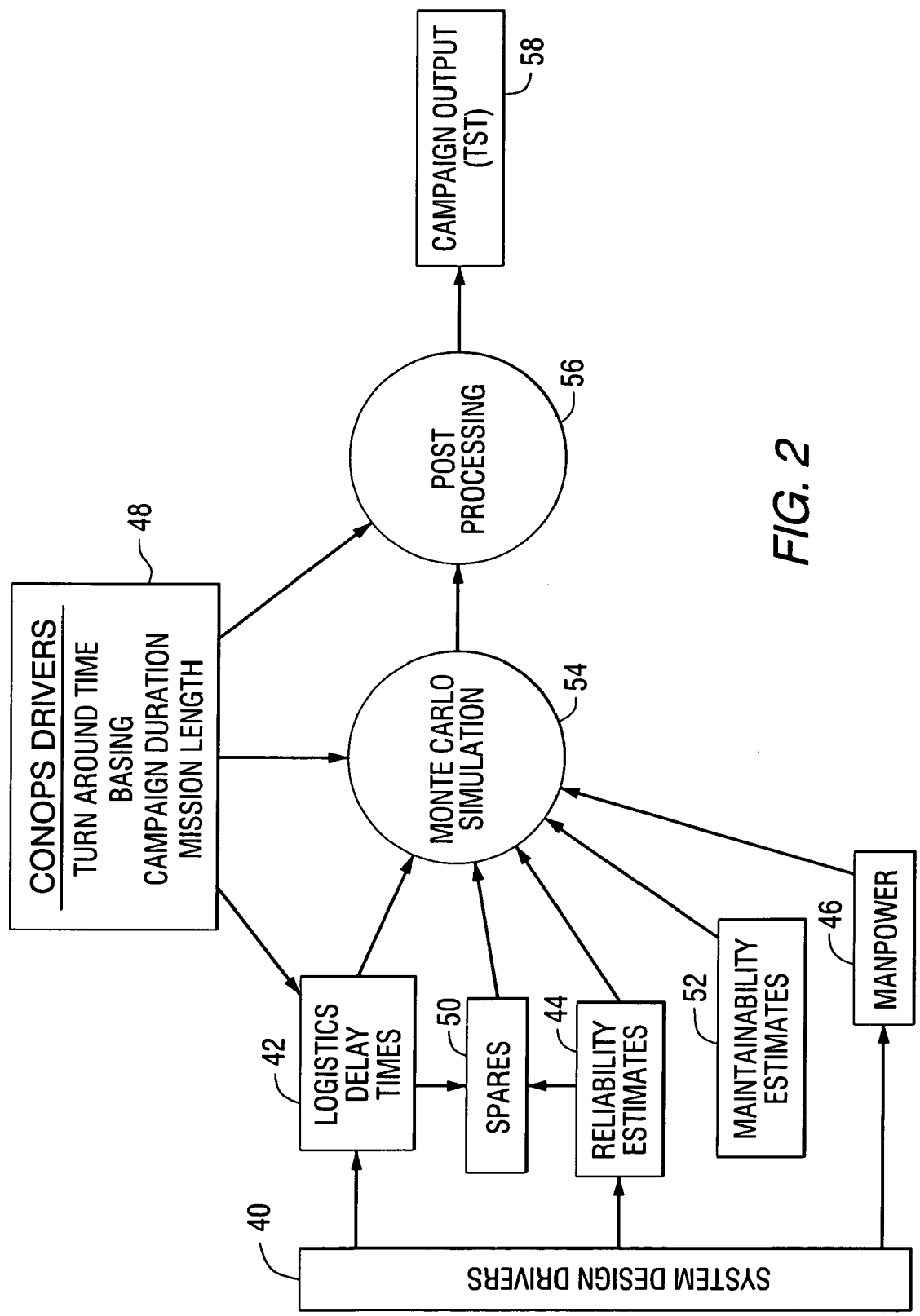
FIG. 2 is a block diagram that illustrates the method of this invention.

This invention provides a method and apparatus for analyzing surveillance systems that provides an indication of the utility of the system. FIG. 2 is a block diagram that illustrates the method of the invention. The method can be performed using, for example, a computer or other information-processing device. Inputs to the system include system design drivers 40 including logistics delay times 42, reliability estimates 44 and manpower 46. Concept of Operations (CONOPS) drivers 48 include turnaround time (TAT), basing information, campaign duration, and mission length. These drivers, along with spares information 50 and maintainability estimates 52 are processed in a Monte Carlo simulation 54 to produce an output that is subjected to post-processing 56 to produce a campaign output 58. The campaign output includes a calculated total surveillance time metric to provide an indication of the utility of the system.

FIG. 3 is a schematic diagram that illustrates the total surveillance time calculation technique of this invention for an example surveillance system that includes three assets. As used in this example, an asset is a surveillance device that is capable of providing surveillance of an area of interest.

For the purposes of this example, assume that each asset is an aircraft containing surveillance equipment. In FIG. 3, the box legends are: T for taxi time, I for ingress time, C for coverage time, E for egress time, and M for maintenance time. The taxi time is the time required for an aircraft to taxi to a take-off point. The ingress time is the time required for the aircraft to fly to the area of interest. The coverage time is the time during which the aircraft provides surveillance of the area of interest. The egress time is the time required for the aircraft to return to the base. The maintenance time is the time required to prepare the aircraft for another mission.

The operation of a first asset is illustrated by stripe 60. Beginning at time $T_0$, time period 62 represents a first time period in which the first asset is taxiing to a take-off position. Time period 64 represents a second time period in which the first asset is traveling to an area of interest. Time period 66 represents a third time period in which the first asset is providing surveillance coverage of the area of interest. Time period 68 represents a fourth time period in which the first asset is returning to a base. Time period 70 represents a fifth time period in which the first asset is undergoing maintenance. Upon completion of the maintenance, the first asset is ready to perform additional surveillance.

The operation of a second asset is illustrated by stripe 72. Time period 74 represents a first time period in which a second asset is taxiing to a take-off position. Time period 76 represents a second time period in which the second asset is traveling to an area of interest. Time period 78 represents a third time period in which the second asset is providing surveillance coverage of the area of interest. Time period 80 represents a fourth time period in which the second asset is returning to a base. Time period 82 represents a fifth time period in which the second asset is undergoing maintenance. Upon completion of the maintenance, the second asset is ready to perform additional surveillance.

The operation of a third asset is illustrated by stripe 84. Time period 86 represents a first time period in which the third asset is taxiing to a take-off position. Time period 88 represents a second time period in which the third asset is traveling to an area of interest. Time period 90 represents a third time period in which the third asset is providing surveillance coverage of the area of interest. Time period 92 represents a fourth time period in which the third asset is returning to a base. Time period 94 represents a fifth time period in which the third asset is undergoing maintenance.

As shown in stripe 96 of FIG. 3, at time $T_1$, the first asset begins surveillance coverage of the area of interest. At time $T_2$, the first asset ceases surveillance and the second asset begins coverage of the area of interest. At time $T_3$, the second asset ceases surveillance and the third asset begins coverage of the area of interest. At time $T_4$, the third asset experiences a failure that prevents further coverage of the area of interest. Since the first asset is ready to return to service when the third asset experiences a failure, the first asset is employed to take over the coverage responsibility. However, time is required for the first asset to taxi to a launch position, and to travel to the area of interest. Thus there is a gap in coverage from time $T_4$ to time $T_5$. After time $T_5$, coverage of the area of interest resumes using the first asset. The total surveillance time is then the total time of coverage as indicated in stripe 96.

FIG. 4 is a block diagram of a system 100 constructed in accordance with an embodiment of the invention. The system includes a computer 102 that is programmed to process information about the operation of assets in the intelligence, surveillance and reconnaissance system to produce an indication of a total surveillance time for various operating scenarios of the assets, and a user interface 104 operatively coupled to the computer system for inputting data into the computer system and for receiving the indication of a total surveillance time.

Total Surveillance Time (TST) in a scenario/campaign based system measures the level of continuous ISR coverage using all deployed assets. The TST metric uses a Monte Carlo simulation to model the combined effects of inherent system design on ISR coverage. TST gives an understanding of an ISR system's ability to provide required coverage.

A Monte Carlo simulation capability exists in many commercial reliability software products. It typically draws failures and repair times from probability distributions chosen to model the system being analyzed. This simulates the random occurrence of failures and repairs, allowing a researcher to observe the effects of chance combinations of events, giving a range of outcomes instead of a single prediction metric.

The modeler chooses Reliability Estimates and Maintainability Estimates from probability distributions for each component of the system. From operational doctrine or an Acceptable Performance Level (APL) document for the system, the number of components, k, required for success, out of all the blocks connecting into a node, n, is entered. A simulation of system operation is run for a period of time consistent with its mission profile. The report of the events provided by this Monte Carlo simulation becomes an input to a TST algorithm for the system-of-systems.

This invention uses the output of the Monte Carlo simulation as a sequence of random events representing the behavior of elements of the system for a period of time. Additional fidelity may be added by including information about the support system, such as, pre- and post-maintenance logistics delay times. This models real-world repairs, since maintenance time estimates include active repair time only. Further realism may be added by supplying spares quantities, reorder points, and order times in the spares data for each component. Each component may also indicate the manpower resources required to complete a repair. These three support resources add more realism to the model. In its simplest form, each component fails in accordance with its failure distribution and can be repaired in accordance with its repair distribution. Logistics delays, and time awaiting parts or personnel add to the basic repair time.

Each item in the system-of-systems in FIG. 1 would have its own Monte Carlo simulation. In the TST approach, each simulation would be run for the specified period of time, typically a 30-day campaign. FIG. 3 shows how the TST algorithm combines data from the Monte Carlo output of the Reliability and Maintainability software application. TST post-processes the event reports, drawing multiple runs from multiple systems (for example, the air vehicles). Each mission is post-processed based on the event report, as discussed earlier. At the end, the TST algorithm adds all the coverage and divides it by the period of the campaign. This yields a metric from zero to 1.0 representing the Total Surveillance Time that the system achieved.

The Total Surveillance Time (TST) is a better metric for C4ISR assets than traditional R&M metrics. TST has been used successfully to evaluate single platforms, multiple platforms, and ground stations. Monte Carlo simulation and dynamic re-tasking combine to predict field performance in a typical contingency or conflict. The method of this invention is easily adaptable to a wide variety of missions where gapless coverage is the goal.

In one embodiment of the invention, a family of system level Monte Carlo models is developed, each with specific component level reliability, maintainability and support system parameters. Multiple runs of these system level simulations are performed to develop a database of random events. A mission timeline based on user-supplied mission profiles containing Taxi, Ingress, Coverage, Egress, and Repair/Turnaround times is constructed. An overlay of post-processed missions to span the period of the campaign is constructed. Then the total coverage achieved over the period of interest is calculated.

While the invention has been described in terms of several embodiments, it will be apparent to those skilled in the art that various changes can be made to the described embodiments without departing from the scope of the invention as set forth in the following claims.

What is claimed is:

1. A method comprising the steps of:
   receiving information concerning the operation of surveillance assets; and
   using the information in a Monte Carlo simulation to produce an estimate of total surveillance time.

2. The method of claim 1, wherein the information concerning the operation of surveillance assets comprises:
   reliability information; and
   maintainability information.

3. The method of claim 2, wherein the reliability information includes one or more of:
   mean time between failures;
   failure distributions;
   redundancies; and
   acceptable performance level.

4. The method of claim 2, wherein the maintainability information includes one or more of:
   maintenance concept;
   mean time to repair estimates; and
   repair distributions.

5. The method of claim 1, wherein the step of using the information in a Monte Carlo simulation to produce an estimate of total surveillance time comprises the steps of:
   producing a family of system level Monte Carlo simulations, each including specific component level reliability, maintainability and support system parameters; and
   running the system level Monte Carlo simulations to develop a database of random events.

6. The method of claim 5, further comprising the steps of:
   constructing a mission timeline based on user-supplied mission profiles containing Taxi, Ingress, Coverage, Egress, and Repair/Turnaround times;
   constructing an overlay of post-processed missions to span a period of interest; and
   calculating total coverage achieved over the period of interest.

7. An apparatus for providing an indication of the utility of an intelligence, surveillance and reconnaissance system, the apparatus comprising:
   a computer programmed to process information about the operation of assets in the intelligence, surveillance and reconnaissance system to produce an indication of a total surveillance time for various operating scenarios of the assets; and
   a user interface operatively coupled to the computer system for inputting data into the computer system and for receiving the indication of a total surveillance time.

8. The apparatus of claim 7, wherein the computer uses a Monte Carlo simulation to produce the indication of a total surveillance time.

9. The apparatus of claim 7, wherein the information concerning the operation of surveillance assets comprises:
   reliability information; and
   maintainability information.

10. The apparatus of claim 9, wherein the reliability information includes one or more of:
    mean time between failures;
    failure distributions;
    redundancies; and
    acceptable performance level.

11. The apparatus of claim 9, wherein the maintainability information includes one or more of:
    maintenance concept;
    mean time to repair estimates; and
    repair distributions.

12. The apparatus of claim 7, wherein the computer is further programmed to:
    produce a family of system level Monte Carlo simulations, each including specific component level reliability, maintainability and support system parameters; and
    run the system level Monte Carlo simulations to develop a database of random events.

13. The apparatus of claim 12, wherein the computer is further programmed to:
    construct a mission timeline based on user-supplied mission profiles containing Taxi, Ingress, Coverage, Egress, and Repair/Turnaround times;
    construct an overlay of post-processed missions to span a period of interest; and
    calculate total coverage achieved over the period of interest.

* * * * *